Dec. 25, 1928.
J. C. SOSNOWSKI
SPEEDOMETER ACTUATED CIRCUIT CLOSER
Filed Sept. 8, 1926
1,696,458
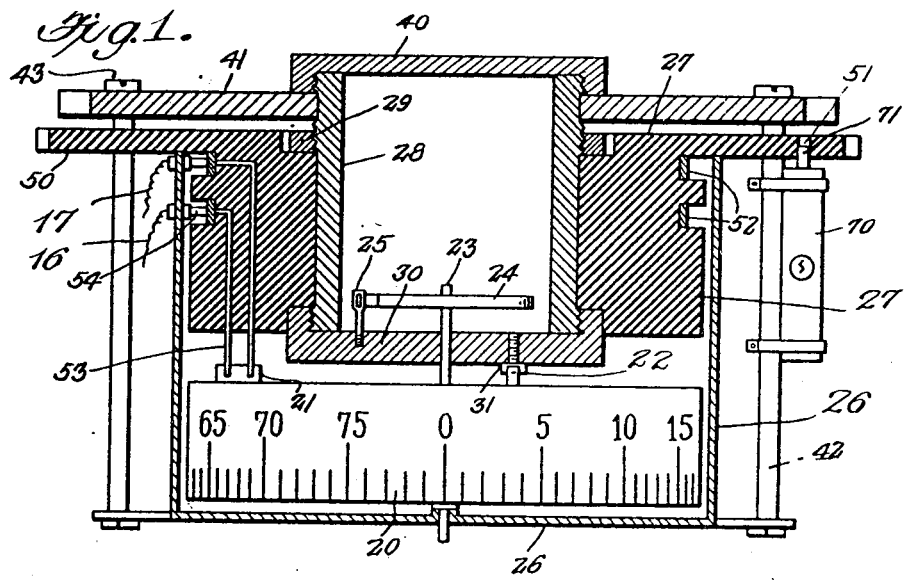
Fig. 1.
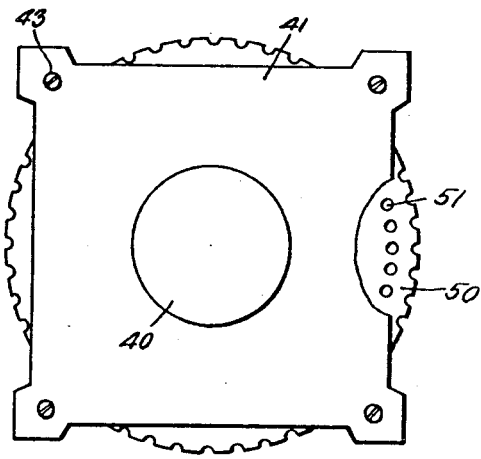
Fig. 2.
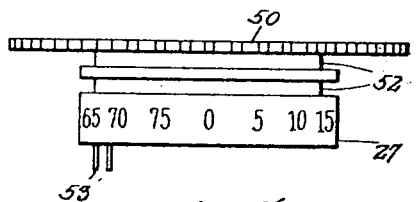
Fig. 3.
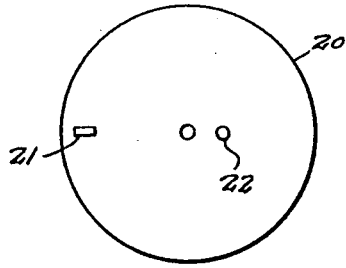
Fig. 4.
Fig. 5.
Inventor
J. C. Sosnowski,
By Clarence A O'Brien
Attorney Patented Dec. 25, 1928.

1,696,458

UNITED STATES PATENT OFFICE.

JULIUS C. SOSNOWSKI, OF LONG BEACH, CALIFORNIA.

SPEEDOMETER-ACTUATED CIRCUIT CLOSER.

Application filed September 8, 1926. Serial No. 134,232.

The object of my invention is the provision of a speedometer actuated circuit closer of peculiar and advantageous construction.

Other objects and practical advantages of the invention will be fully understood from the following description and claims when the same are read in connection with the drawings, accompanying and forming part of this specification, in which:

Figure 1 is a view, partly in elevation and partly in diametrical section, illustrating my improvement adjacent to the speedometer dial of a motor vehicle.

Figure 2 is a top plan view of the same, on a reduced scale.

Figure 3 is a detail elevation illustrative of the turnable dial of my improvement.

Figure 4 is an inverted plan view of the same.

Figure 5 is a top plan view on a reduced scale showing the speedometer dial equipped for use in conjunction with my improvement.

Similar numerals of reference designate corresponding parts in all the views of the drawings.

At 20, Figures 1 and 5, I show the rotary dial of a speedometer, the said rotary dial being of the usual construction save that it is provided with an upwardly extending bridge plate 21 of conductive material and is also provided with an upstanding projection 22. The pinion of the dial 20 is designated by 23 and is associated with the usual hair spring 24, mounted at 25 on a pin hereinafter alluded to.

The dial 20 and its described appurtenances are disposed in a casing 26, and the said casing 26 will of course be provided with sight openings, not shown, one for use in cooperation with the figures on the perimeter of the dial 20 and the other for use in conjunction with the figures on the perimeter on the turnable dial 27 of my improvement.

The said turnable dial 27 is freely movable about an upright tube 28, the said tube 28 being equipped with an annular nut 29 and with a cap 30 between which the dial 27 is interposed and confined. The cap 30 is threaded on the lower portion of the tube 28 and carries the before-mentioned pin 25 and also carries a screw or other appropriate projection 31 designed to cooperate with the projection 22 on the dial 20 in preventing back lash of the dial 20 beyond the zero point.

Threaded upon the upper end of the tube 28 is a cap 40 and this cap 40 bears upon and is supported by a plate 41, which, in turn, is supported by pillars 42, being secured to the said pillars 42 by nuts 43.

The figures on the perimeter of the dial 27 are in the same relative order as the figures on the perimeter of the speedometer dial 20.

The dial 27 is provided with a flange 50, and in the said flange 50 is formed a circular series of apertures 51, Figures 1 and 2. The dial 27 is also provided with circumferential bands 52 of conductive material, and in electric connection with the conductive bands 52 and carried in and by the dial 27 are terminals 53 which depend from the dial 27 and are arranged to be engaged by the bridge plate 21 when the motor vehicle attains a predetermined speed, as hereinafter set forth.

It will also be understood from Figure 1 that brushes or other appropriate contact elements 54 are carried by though insulated from the casing and are arranged to make electric connection with the bands 52 as appears in Figure 1, and this without the electric connection being interfered with by turning of the dial 27.

One of the brushes or contact elements 54 is connected with a conductor 16, and the other contact element or brush 54 is connected with a conductor 17.

From this it follows that when a motor vehicle attains a predetermined speed, the bridge plate 21 on the speedometer dial 20 will effect electric connection between the terminals 53 and in consequence a circuit including the conductors 16 and 17, a source of electric energy and any desired electromechanical device will be closed. It is to be noted, however, that incident to lessening of the speed of the motor vehicle, and the consequent turning of the dial 20, the bridge plate 21 will be moved out of contact with the terminals 53 to break said circuit.

In order that the rate of speed at which the circuit alluded to will be closed may be varied, I provide in conjunction with the apertured flange 50 of the dial 27 a lock 70 fixed to one of the pillars 42 or to any other appropriate part of the main frame of the device. The said lock 70 is subject to the control of a particular key designed to be carried by or in the custody of an authorized person, and the lock is provided with a bolt 71 adapted to be projected into and withdrawn from the apertures 51 and this by manipulation of the key alluded to. Manifestly, when the bolt 71 is retracted, the dial 27 may be readily turned about the tube 28 until the figure representing the desired speed limit is displayed through the sight opening of the casing before referred to, and then the bolt 71 is projected into one of the apertures of the dial flange 50 whereby the dial 27 will be securely locked in position.

It will be apparent from the foregoing that my novel circuit closer is reliable in operation, and that the said circuit closer is simple, compact and inexpensive in construction.

I have specifically described the construction and relative arrangement of the parts embraced in the present and preferred embodiment of my invention in order to impart a full, clear, and exact understanding of the said embodiment. I do not desire, however, to be understood as limiting myself to the precise construction and relative arrangement of parts as disposed, my invention being defined by my appended claims within the scope of which modifications may be made without departure from my invention.

Having thus described the invention, what I claim is:—

1. The combination of a speedometer having a movable part and conductive means thereon, an adjustable dial having terminals adapted to be directly connected electrically by said conductive means when a predetermined speed is attained, and means for locking said dial in different positions; the said means comprising a flange on the dial and a circular series of apertures in said flange, and a fixed lock having a key controlled bolt movable into and out of engagement with the apertured flange.

2. In means for the purpose described, and in combination, a casing, a frame fixed with respect to said casing and comprising pillars and a plate supported on the pillars, a speedometer disposed in the casing and having a movable part and conductive means thereon, a tube, a top secured on the lower end of said tube, a nut secured on an intermediate portion of the tube, a cap secured on the upper portion of the tube and bearing on and supported by said plate, a dial of insulating material turnable about the tube and confined below the lower cap and the annular nut and having a flange with a circular series of apertures and also having circumferential grooves, terminals carried by said dial and adapted to be directly connected electrically by said conductive means, conductive bands in said groove and electrically connected with said terminals, stationary contacts electrically connected with said conductive bands, and a stationary lock having a key controlled bolt movable into and out of apertures in the flange of the dial.

In testimony whereof I affix my signature.

JULIUS C. SOSNOWSKI.